(12) United States Patent
Tan et al.

(10) Patent No.: US 8,200,374 B2
(45) Date of Patent: Jun. 12, 2012

(54) METHODS OF OPERATING A CONTROL SYSTEM OF A VEHICLE AND VEHICLE SYSTEMS

(75) Inventors: Hualin Tan, Novi, MI (US); Shih-Ying Sheu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 500 days.

(21) Appl. No.: 12/472,981

(22) Filed: May 27, 2009

(65) Prior Publication Data
US 2010/0305810 A1    Dec. 2, 2010

(51) Int. Cl.
*G05D 1/00*    (2006.01)
(52) U.S. Cl. .............................................. 701/1; 701/70
(58) Field of Classification Search ........................ None
See application file for complete search history.

(56) References Cited

U.S. PATENT DOCUMENTS

| | | | |
|---|---|---|---|
| 4,741,207 A * | 5/1988 | Spangler | 73/146 |
| 5,446,658 A | 8/1995 | Pastor et al. | |
| 7,269,494 B2 * | 9/2007 | Corigliano et al. | 701/80 |
| 2007/0208524 A1 * | 9/2007 | Niepelt et al. | 702/85 |

* cited by examiner

*Primary Examiner* — Michael J. Zanelli
(74) *Attorney, Agent, or Firm* — Ingrassia Fisher & Lorenz, P.C.

(57) ABSTRACT

Methods for operating a control system of a vehicle and vehicle systems are provided. A method includes receiving a first output signal from a longitudinal accelerometer during a first travel condition of the vehicle including a first vehicle speed of the vehicle and a first road grade substantially equal to zero, wherein the first vehicle speed is a constant speed and the first output signal represents a first measurement including a first vehicle acceleration component and a bias offset component, receiving a second output signal during a second travel condition of the vehicle including a second vehicle speed of the vehicle and a second road grade, wherein the second output signal represents a second measurement including a second vehicle acceleration component and the bias offset component, and determining the bias offset component and gravity component to obtain an estimated road grade factor.

15 Claims, 2 Drawing Sheets

US 8,200,374 B2

METHODS OF OPERATING A CONTROL SYSTEM OF A VEHICLE AND VEHICLE SYSTEMS

TECHNICAL FIELD

The inventive subject matter generally relates to vehicles, and more particularly relates to control systems of vehicles.

BACKGROUND

During operation of a vehicle, sensors such as longitudinal accelerometers are often used to measure acceleration values, such as longitudinal acceleration values. Although longitudinal accelerometers generally provide useful information regarding vehicle acceleration, data sensed by the longitudinal accelerometer can be influenced by miscellaneous factors. For example, factors such as electrical bias from a sensor, gravity from a hill, an uneven (banked) road, and/or other environmental conditions may be unintentionally incorporated into the sensed data, which may undesirably affect operation of certain dynamic vehicle controls, such as vehicle stability and/or traction controls.

Accordingly, it is desirable to have an improved method and system capable of simultaneously determining and/or accounting for sensor bias and environmental conditions in vehicle longitudinal accelerometers. In addition, it is desirable for the improved method and system to be capable of being retrofitted into existing vehicles. Furthermore, other desirable features and characteristics of the inventive subject matter will become apparent from the subsequent detailed description and the appended claims, taken in conjunction with the accompanying drawings and the foregoing technical field and background.

BRIEF SUMMARY

Methods for operating a control system of a vehicle and vehicle systems are provided.

In an embodiment, by way of example only, a method includes receiving a first output signal from a longitudinal accelerometer during a first travel condition of the vehicle, the first travel condition including a first vehicle speed of the vehicle and a first road grade, wherein the first vehicle speed is a constant speed, the first road grade is substantially equal to zero, and the first output signal represents a first measurement including a first vehicle acceleration component and a bias offset component, receiving a second output signal from the longitudinal accelerometer during a second travel condition of the vehicle, the second travel condition including a second vehicle speed of the vehicle and a second road grade, wherein the second output signal represents a second measurement including a second vehicle acceleration component and the bias offset component, and subtracting the bias offset component from the second output signal to obtain an intermediate longitudinal acceleration output signal from the longitudinal accelerometer, determining a first gravity component included in the intermediate longitudinal acceleration output signal by calculating a derivative of a wheel speed component included in a third measurement represented by a first output signal from a wheel speed sensor, calculating a difference between the intermediate longitudinal acceleration and the derivative of the wheel speed component, wherein the difference of represents the first gravity component, and processing the first gravity component to produce a final gravity component, wherein an estimated road grade factor comprises the final gravity component and the bias offset component.

In another embodiment, by way of example only, a vehicle system includes a longitudinal accelerometer, a speed sensor, and a controller. The longitudinal accelerometer is adapted to sense an acceleration of a vehicle and to provide an output signal including a vehicle acceleration component, a gravity component, and a bias offset component. The speed sensor is adapted to sense a vehicle speed and to provide an output signal including a wheel speed component. The controller is in operable communication with the longitudinal accelerometer and the speed sensor and is adapted to (1) receive a first output signal from the longitudinal accelerometer while the vehicle is subjected to a first travel condition, the first travel condition including a first vehicle speed of the vehicle and a first road grade, wherein the first vehicle speed is a substantially constant speed, the first road grade is substantially equal to zero, and the first output signal represents a first measurement including a first vehicle acceleration component and a bias offset component, (2) receive a second output signal from the longitudinal accelerometer while the vehicle is subjected to a second travel condition, the second travel condition including a second vehicle speed of the vehicle and a second road grade, wherein the second output signal represents a second measurement including a second vehicle acceleration component and the bias offset component, (3) subtract the bias offset component from the second output signal to obtain an intermediate longitudinal acceleration output signal, and (4) determine a first gravity component included in the intermediate longitudinal acceleration output signal by calculating a derivative of a wheel speed component included in a third measurement represented by a first output signal from a wheel speed sensor and calculating a difference between the intermediate longitudinal acceleration and the derivative of the wheel speed component, wherein the difference of represents the first gravity component.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

Figure 1:
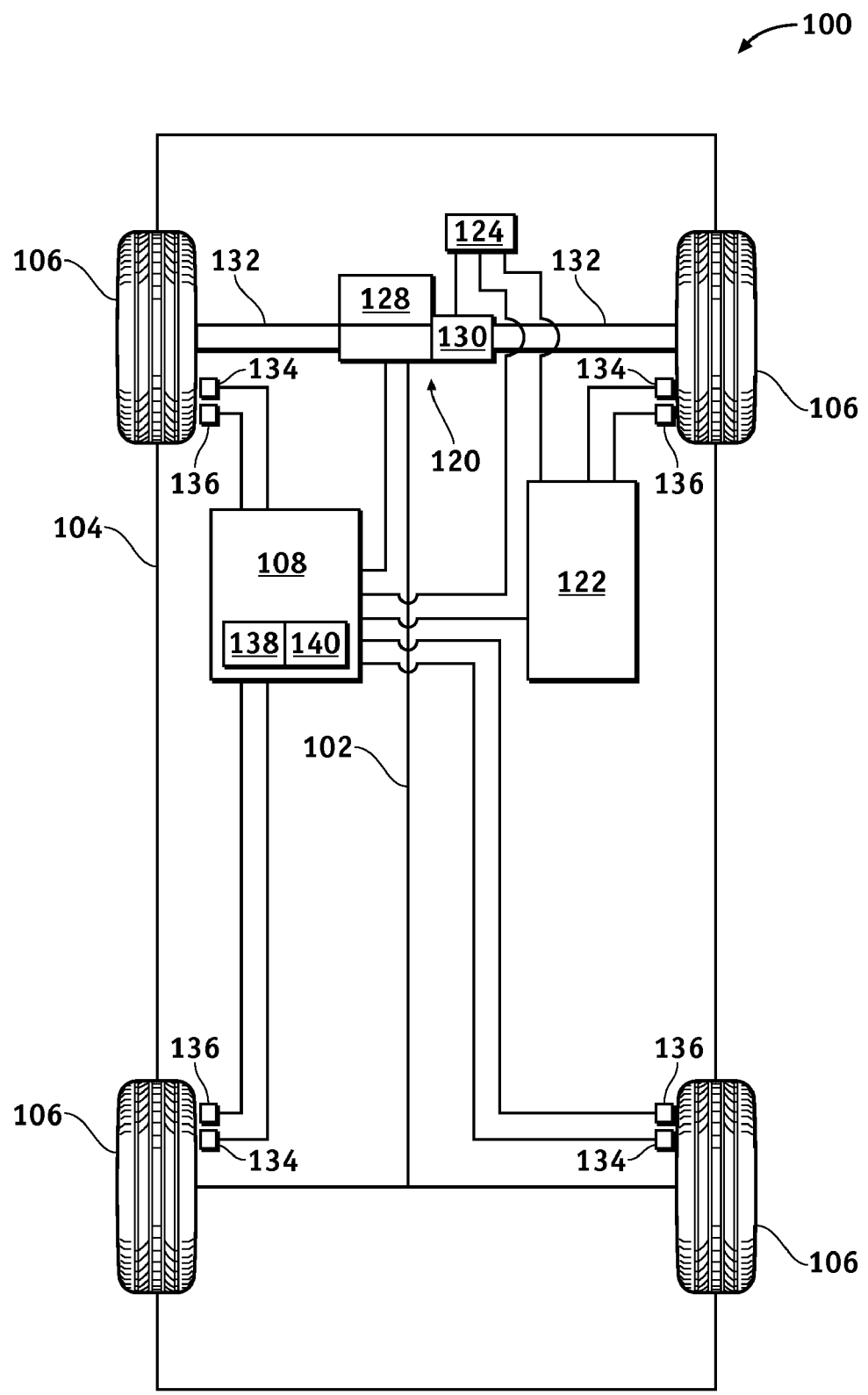
FIG. 1 is a schematic of a vehicle, according to an embodiment.

FIG. 1 is a schematic of a vehicle 100, according to an embodiment. The vehicle 100 is configured to provide a longitudinal acceleration signal that does not include a bias offset, in an embodiment. In another embodiment, the vehicle 100 further may be configured to provide the longitudinal acceleration signal for which gravity factors have been compensated. In this way, the longitudinal acceleration signal provided by the vehicle 100 may more accurately represent actual longitudinal acceleration data. The more accurate the longitudinal acceleration signal may, in turn, be used to determine various vehicle dynamic status calculations more accurately.

In an embodiment, the vehicle 100 includes a chassis 102, a body 104, four wheels 106, and an electronic control system 108. The body 104 is arranged on the chassis 102 and substantially encloses other components of the automobile 100. The body 104 and the chassis 102 may jointly form a frame. The wheels 106 are each rotationally coupled to the chassis 102 near a respective corner of the body 104, in an embodiment.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines, such as, for example, a gasoline or diesel fueled combustion engine, a "flex fuel vehicle" (FFV) engine (i.e., an engine that uses a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor. Embodiments may be incorporated into vehicles other than an automobile.

According to an embodiment, the vehicle 100 is an HEV, and further includes an actuator assembly 120, a battery system 122, and an inverter 124. The actuator assembly 120, the battery system 122, and the inverter 124 are in operable communication with the electronic control system 108.

The actuator assembly 120 includes a combustion engine 128 and an electric motor/generator (or motor) 130. In an embodiment, the combustion engine 128 and/or the electric motor 130 are integrated such that one or both are mechanically coupled to at least some of the wheels 106 through one or more drive shafts 132. In one embodiment, the vehicle 100 is a "series HEV," in which the combustion engine 128 is not directly coupled to the transmission, but coupled to a generator (not shown), which is used to power the electric motor 130. In another embodiment, the vehicle 100 is a "parallel HEV," in which the combustion engine 128 is directly coupled to the transmission by, for example, having a rotor of the electric motor 130 rotationally coupled to the drive shaft 132 of the combustion engine 128.

Although not shown in detail, the electric motor 130, in one embodiment, includes a stator assembly (including conductive coils or windings) and a rotor assembly (including a ferromagnetic core and/or magnets), as well as a transmission. The stator assembly and/or the rotor assembly within the electric motor 130 may include multiple electromagnetic poles (e.g., sixteen poles), as is commonly understood.

The battery system 122 may be configured to supply high voltage direct current (DC) power to the inverter 124, which may include a three-phase circuit coupled to the motor 130 to convert the DC power to alternating current (AC) power. In this regard, the inverter 124 may include a switch network having a first input coupled to the battery system 122 (i.e., a voltage source ($V_{dc}$)) and an output coupled to the motor 130. The switch network may include three pairs (a, b, and c) of series switches (e.g., insulated gate bipolar transistors (IGBTs) within integrated circuits formed on semiconductor substrates) with antiparallel diodes (i.e., antiparallel to each switch) corresponding to each of the phases of the motor 130.

In addition to being in communication with the actuator assembly 120, the battery system 122, and the inverter 124, the electronic control system 108 is in operable communication with the wheels 106 and collects data from one or more sensors 134, 136 mounted on or proximate to the wheels 106 to determine how to dynamically control the actuator assembly 120, the battery system 122, and/or the inverter 124. In an embodiment, the one or more sensors 134, 136 may be configured to at least facilitate measurement of longitudinal acceleration values, gravity values, other environmental condition values, and/or any of numerous different other types of values, which can be stored and retrieved in or between different time periods of vehicle operation via the memory 138. Thus, for example, the sensors 134, 136 may include one or more longitudinal accelerometers 134, wheel speed sensors 136, and/or other sensors.

To retain and process the data collected by the sensors 134, 136, the electronic control system 108 may include a memory 138 and a processor 140. The processor 140 is configured to at least facilitate storing and/or retrieving such data and/or other data into or from the memory 138, in an embodiment. The processor 140 may be further configured to perform various calculations, determinations, and comparisons pertaining to the data collected by the sensors 134, 136 and/or various other information or data pertaining to the vehicle 100, and/or may facilitate operation of the sensors 134, 136 and/or the memory 138, and/or to perform any of various other different potential functions. The memory 138 includes instructions stored thereon (or in another computer-readable medium) for carrying out the processes and methods as described below, according to an embodiment.

Figure 2:
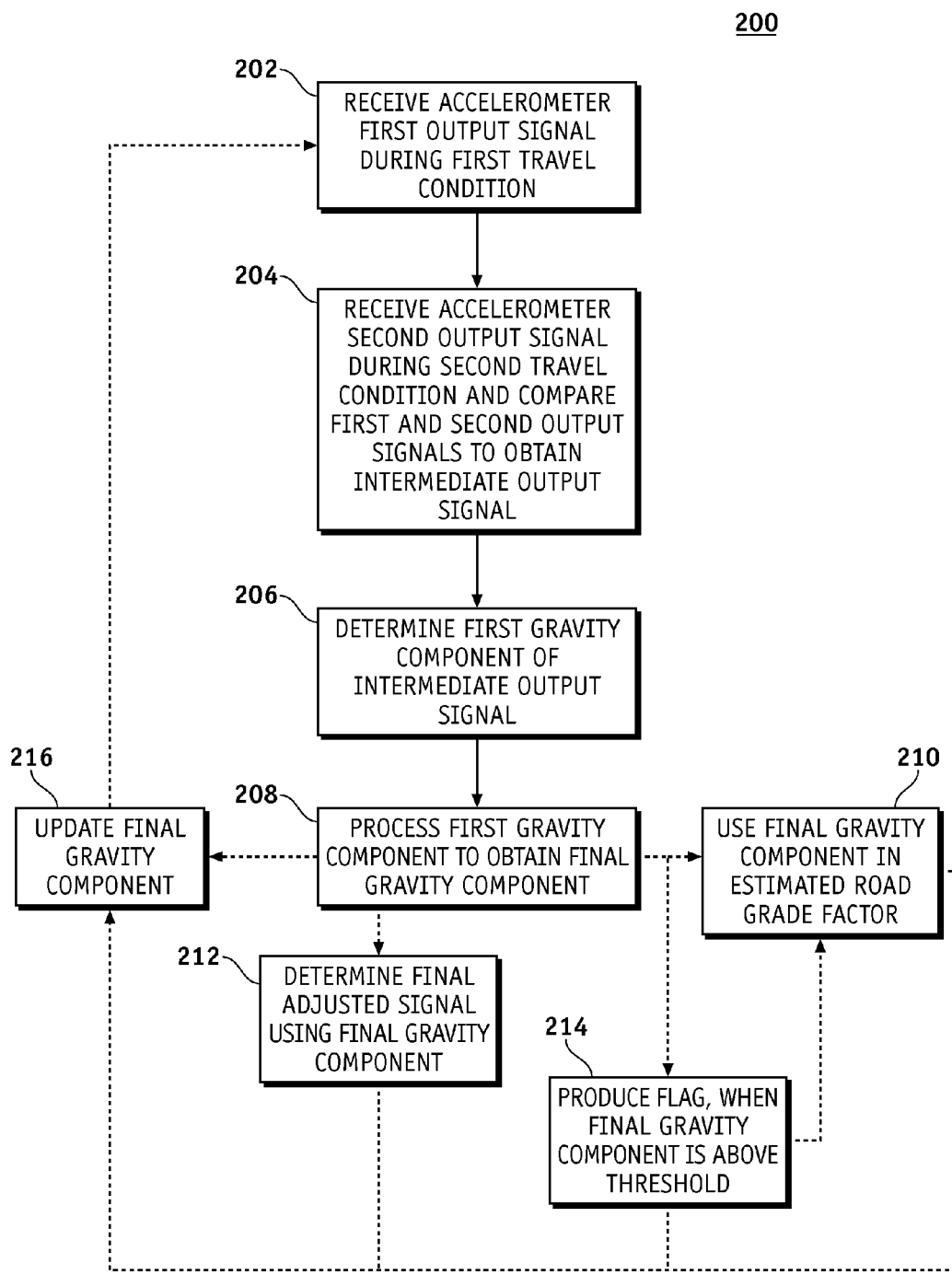
FIG. 2 is a flow diagram of a method of operating a control system of a vehicle, according to an embodiment.

FIG. 2 is a flow diagram of a method 200 of operating a control system (e.g., electronic control system 108) of a vehicle (e.g., vehicle 100), according to an embodiment. In an embodiment, the method 200 may be employed to determine an estimated road grade to thereby provide a final adjusted longitudinal acceleration signal in which bias offsets and gravity factors have been compensated for. The final adjusted longitudinal acceleration signal may be used in various subsequent calculations and/or processes related to dynamic stability control of the vehicle 100 and thus, may be useful for provide more accurate results.

In accordance with an embodiment, method 200 begins when a first output signal from a longitudinal accelerometer is received by the control system, while the vehicle is subjected to a first travel condition, block 202. With reference to FIG. 1, one or more of the sensors (e.g., the longitudinal accelerometers 134) senses data related to the first travel condition. The first travel condition may include a first vehicle speed of the vehicle and a first road grade, wherein the first vehicle speed is a substantially constant speed during a first measurement period and the first road grade is substantially equal (e.g., ±1%) to zero. Based on the sensed data, the first output signal, which represents a first measurement including a first vehicle acceleration component and a bias offset component, is produced. The term "acceleration component" may be defined herein as a longitudinal acceleration, in units of g, sensed by the longitudinal accelerometer 134. The term "bias offset component" may be defined herein as a voltage offset that is associated with a particular longitudinal accelerometer. The value may vary between different longitudinal accelerometers and may change over time and/or during vehicle motion. The sensors 134 then transmit the first output signal to the processor 140, and data associated with the first output signal may be stored in the memory 138, in an embodiment.

During a second measurement period, a second output signal from the longitudinal accelerometer is received, while the vehicle is subjected to a second travel condition, and a difference is determined between the second output signal and the first output signal to obtain an intermediate longitudinal acceleration output signal, block 204. For example, the sensors 134, 136 may sense the second travel condition, which includes a second vehicle speed and a second road grade. In an embodiment, the second road grade is not substantially equal to zero. The sensor 134 may produce the second output signal representing a second measurement including a second vehicle acceleration component and the bias offset component. The sensor 134 transmits the second output signal to the processor 140. According to an embodiment, the difference between the first and second output signals is calculated to isolate the bias offset component. In another embodiment, the bias offset component is then subtracted from the second output signal to obtain the intermediate longitudinal acceleration output signal. In such an embodiment, the intermediate longitudinal acceleration output signal may be stored in the memory 138.

After the intermediate longitudinal acceleration output signal is obtained, a first gravity component of the intermediate longitudinal acceleration output signal is determined, block 206. In an embodiment, one or more of the sensors (e.g., the wheel speed sensors 136) obtains a third measurement by sensing data related to wheel speed. The wheel speed sensors 136 produce output signals, which are transmitted to the processor 140. The processor 140 calculates a derivative of a wheel speed component of the wheel speed and calculates a difference between the intermediate longitudinal acceleration and the derivative of the wheel speed component. The derivative of the wheel speed component represents a wheel acceleration. For example, the derivative of the wheel speed component may be calculated as follows:

$$\text{WheelAccel}[k]=(\text{WheelSpeed}[k]-\text{WheelSpeed}[k-1])/\text{SampleTime}$$

The difference represents the first gravity component.

The first gravity component may undergo further processing to produce a final gravity component, block 208. According to an embodiment, further processing may include filtering a signal representing the first gravity component by the processor 140 to remove unwanted noise from the signal (e.g., to remove one or more frequencies present in the first gravity component that are outside of a predetermined frequency range). In this regard, for example, the processor 140 may filter the first gravity component signal through a high pass filter, a low pass filter or another type of signal noise filter. For example, the first gravity component may be filtered as follows:

$$\text{GravityFiltered}[k]=\text{FilterCoefficient}*\text{GravityUnfiltered}[k]+(1-\text{FilterCoefficent})*\text{GravityFiltered}[k-1]$$

In another embodiment, the first gravity component may not need to undergo filtering, and thus, the final gravity component may be substantially equal to the first gravity component. In an example, the first gravity component may retain its value under certain vehicle operations such as during a stop-and-go condition, so as to remove an impact of vehicle pitching motion from the determination of the final gravity component.

In any case, the final gravity component may be used in various other processes for controlling the vehicle. In an embodiment, the final gravity component may be used to calculate an estimated road grade factor, block 210. In accordance with an embodiment, the estimated road grade factor may represent an estimate of a current road grade and may be employed in subsequent calculations that may be useful for stability control of the vehicle. For example, factors on which the stability control calculations depend may include a vehicle reference speed, a tire force estimation, a hill-hold algorithm, a down-hill engine reduction calculation, and other factors.

In accordance with another embodiment, the final gravity component may be used to determine a final adjusted longitudinal acceleration signal, block 212. The final adjusted longitudinal acceleration signal may be used for calculating a vehicle reference speed and a tire force estimation. In this regard, in an embodiment, a third output signal from the longitudinal accelerometer may be received while the vehicle is subjected to a third travel condition. In an example, the longitudinal accelerometer 134 may sense data related to the third travel condition, which may include a third vehicle speed and a third road grade. The longitudinal accelerometer 134 may produce the third output signal, which may represent a third vehicle acceleration component, a second gravity component, and the bias offset value. The third output signal may be transmitted to the processor 140, in an embodiment. Subsequently, a final adjusted longitudinal acceleration signal may be calculated by subtracting the bias offset component from the third output signal and subtracting the final gravity component from the third output signal, which may be performed by the processor 140. When the calculations are completed by the processor 140, the processor 140 may transmit the calculated data as the final adjusted longitudinal acceleration signal.

In another embodiment, the road grade factor is not incorporated into the subsequent calculations unless the final gravity component is above a threshold value. In such case, a flag is produced indicating that the final gravity component is above the threshold value, block 214. Exampled of threshold values may be in a range of about 5% to about 10%. For example, the threshold value may be stored in the memory 138, and the processor 140 may compare the final gravity component to the stored threshold value. According to an embodiment, when the final gravity component is above the stored threshold value, the processor 140 may implement a first set of processes that causes the vehicle 100 to operate in a particular manner. Alternatively, when the final gravity component is below the stored threshold value, the processor 140 may implement a second set of processes that causes the vehicle 100 to operate in another particular manner. Thus, in an embodiment, the flag may be a trigger embedded into software stored in the memory 138, which may cause one or more sets of processes to run on the processor 140. In another embodiment, the flag may be a logic condition that acts as a signal to allow different calculations to be carried out. In another embodiment, when the flag is produced, the method 200 may iterate at block 210, where the final gravity component is included in the estimated road grade factor and incorporated into various subsequent stability control processes.

In any case, according to another embodiment, the sensors 134, 136 may sense data related to travel conditions of the vehicle 100 on a continuous basis and thus, may continuously update the final gravity component to provide real-time data, block 216. For example, blocks 202 through 208 may be continuously reiterated to obtain real-time estimated road grade factors at selected time instances. In another embodiment, block 202 may occur at a first time instance, and the method 200 may include updating the bias offset component. According to an embodiment, the step of updating may include receiving a fourth output signal from the longitudinal accelerometer 134 while the vehicle is subjected to a fourth travel condition at a second time instance. In an embodiment, the longitudinal accelerometer 134 may sense data related to the fourth travel condition, such as a fourth vehicle speed and a fourth road grade. In accordance with an embodiment, the fourth vehicle speed may be a substantially constant speed, the fourth road grade may substantially equal zero, and the fourth output signal may represent a third vehicle acceleration component and an updated bias offset component. The longitudinal accelerometer 134 may transmit the fourth output signal, indicating, in part, the updated bias offset component, to the processor 140, in an embodiment. Block 216 may occur after any of blocks 208, 210, 212 and/or 214, in an embodiment.

Accordingly, a method has been provided that is useful in determining sensor bias offset and gravity values over multiple time periods. Moreover, once these values are determined, an estimated road grade may be adjusted to correct longitudinal acceleration values and/or other variables may benefit from adjustment. As a result, greater accuracy for the vehicle longitudinal accelerometers and sensors may be provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A method of operating a control system of a vehicle, the method comprising the steps of:
    receiving a first output signal from a longitudinal accelerometer, while the vehicle is subjected to a first travel condition, the first travel condition including a first vehicle speed of the vehicle and a first road grade, wherein the first vehicle speed is a substantially constant speed, the first road grade is substantially equal to zero, and the first output signal represents a first measurement including a first vehicle acceleration component and a bias offset component;
    receiving a second output signal from the longitudinal accelerometer while the vehicle is subjected to a second travel condition, the second travel condition including a second vehicle speed of the vehicle and a second road grade, wherein the second output signal represents a second measurement including a second vehicle acceleration component and the bias offset component, and subtracting the bias offset component from the second output signal to obtain an intermediate longitudinal acceleration output signal; and
    determining a first gravity component included in the intermediate longitudinal acceleration output signal by calculating a derivative of a wheel speed component included in a third measurement represented by a first output signal from a wheel speed sensor and calculating a difference between the intermediate longitudinal acceleration and the derivative of the wheel speed component, wherein the difference of represents the first gravity component.

2. The method of claim 1, further comprising the step of:
    processing the first gravity component to produce a final gravity component, wherein an estimated road grade factor comprises the final gravity component and the bias offset component.

3. The method of claim 2, wherein the step of processing the first gravity component comprises filtering the first gravity component to remove one or more frequencies present in the first gravity component that are outside of a predetermined frequency range.

4. The method of claim 1, further comprising the step of:
    receiving a third output signal from the longitudinal accelerometer while the vehicle is subjected to a third travel condition, the third travel condition including a third vehicle speed and a third road grade, wherein the third output signal represents a third vehicle acceleration component, a second gravity component, and the bias offset value; and
    producing a final adjusted longitudinal acceleration signal by subtracting the bias offset component from the third output signal and subtracting the final gravity component from the third output signal.

5. The method of claim 1, wherein:
    the second road grade is not substantially equal to zero.

6. The method of claim 1, wherein:
    the step of receiving the first output signal occurs at a first time instance;
    the step of receiving the second output signal occurs at a second time instance; and
    the method further comprises the step of updating the bias offset component by receiving a third output signal from the longitudinal accelerometer while the vehicle is subjected to a third travel condition at a third time instance, the third travel condition including a third vehicle speed and a third road grade, wherein the third vehicle speed is a substantially constant speed, the third road grade substantially equals zero, and the third output signal represents a third vehicle acceleration component and an updated bias offset component.

7. The method of claim 1, further comprising the step of continuously reiterating the steps of receiving a second output signal, determining a first gravity component, and processing the first gravity component to obtain real-time estimated road grade factors at selected time instances.

8. The method of claim 1, further comprising the step of storing the bias offset component in a memory.

9. A vehicle system, comprising:
    a longitudinal accelerometer adapted to sense an acceleration of a vehicle and to provide an output signal including a vehicle acceleration component, a gravity component, and a bias offset component;
    a speed sensor adapted to sense a vehicle speed and to provide an output signal including a wheel speed component; and
    a controller in operable communication with the longitudinal accelerometer and the speed sensor and adapted to (1) receive a first output signal from the longitudinal accelerometer while the vehicle is subjected to a first travel condition, the first travel condition including a first vehicle speed of the vehicle and a first road grade, wherein the first vehicle speed is a substantially constant speed, the first road grade is substantially equal to zero, and the first output signal represents a first measurement including a first vehicle acceleration component and a bias offset component, (2) receive a second output signal from the longitudinal accelerometer while the vehicle is subjected to a second travel condition, the second travel condition including a second vehicle speed of the vehicle and a second road grade, wherein the second output signal represents a second measurement including a second vehicle acceleration component and the bias offset component, (3) subtract the bias offset component from the second output signal to obtain an intermediate longitudinal acceleration output signal, and (4) determine a first gravity component included in the intermediate longitudinal acceleration output signal by calculating a derivative of a wheel speed component included in a third measurement represented by a first output signal from a wheel speed sensor and calculating a difference between the intermediate longitudinal acceleration and the derivative of the wheel speed component, wherein the difference of represents the first gravity component.

10. The vehicle system of claim 9, wherein the controller is further adapted to process the first gravity component to produce a final gravity component, wherein an estimated road grade factor comprises the final gravity component and the bias offset component.

11. The vehicle system of claim 10, wherein the controller is further adapted to continuously reiterate receiving the second output signal, determining the first gravity component, and processing the first gravity component to obtain real-time estimated road grade factors at selected time instances.

12. The vehicle system of claim 9, wherein the controller is further adapted to receive a third output signal from the longitudinal accelerometer while the vehicle is subjected to a third travel condition, the third travel condition including a third vehicle speed and a third road grade, wherein the third output signal represents a fourth measurement including a third vehicle acceleration component, a second gravity component, and the bias offset value, and to produce a final adjusted longitudinal acceleration signal by subtracting the bias offset component from the third output signal and subtracting the final gravity component from the third output signal.

13. The vehicle system of claim 12, wherein the controller is further adapted to receive the first output signal occurs at a first time instance and the second output signal at a second time instance, and to update the bias offset component by receiving a third output signal from the longitudinal accelerometer while the vehicle is subjected to a third travel condition at a third time instance, the third travel condition including a fourth vehicle speed and a fourth road grade, wherein the fourth vehicle speed is a substantially constant speed, the third road grade substantially equals zero, and the third output signal represents a third vehicle acceleration component and an updated bias offset component.

14. The vehicle system of claim 9, further comprising a memory in operable communication with the controller, wherein the memory is adapted to store the bias offset component.

15. The vehicle system of claim 9, further comprising a filter in operable communication with the controller, wherein the filter is adapted to filter the first gravity component to remove one or more frequencies present in the first gravity component that are outside of a predetermined frequency range.

\* \* \* \* \*